(12) United States Patent
Berkman

(10) Patent No.: US 7,602,695 B2
(45) Date of Patent: *Oct. 13, 2009

(54) SYSTEM AND METHOD FOR COMMUNICATING IN A MULTI-UNIT STRUCTURE

(75) Inventor: William H. Berkman, New York, NY (US)

(73) Assignee: Current Technologies, LLC, Germantown, MD (US)

( * ) Notice: Subject to any disclaimer, the term of this patent is extended or adjusted under 35 U.S.C. 154(b) by 48 days.

This patent is subject to a terminal disclaimer.

(21) Appl. No.: 11/421,278

(22) Filed: May 31, 2006

(65) Prior Publication Data

US 2007/0280201 A1 Dec. 6, 2007

(51) Int. Cl.
*H04J 1/12* (2006.01)

(52) U.S. Cl. .................. 370/201; 370/236; 370/351; 370/352; 370/401; 375/257

(58) Field of Classification Search ............. 370/201, 370/236, 351, 352, 401; 375/257
See application file for complete search history.

(56) References Cited

U.S. PATENT DOCUMENTS

| | | | |
|---|---|---|---|
| 3,369,078 A | 2/1968 | Stradley | |
| 3,736,379 A * | 5/1973 | Kagan | 379/93.05 |
| 3,810,096 A | 5/1974 | Kabat et al. | |
| 3,964,048 A | 6/1976 | Lusk et al. | |
| 4,057,793 A | 11/1977 | Johnson et al. | |
| 4,060,735 A | 11/1977 | Pascucci et al. | |
| 4,239,940 A | 12/1980 | Dorfman | |
| 5,066,939 A | 11/1991 | Mansfield, Jr. | |
| 5,257,006 A | 10/1993 | Graham et al. | |
| 5,319,634 A | 6/1994 | Bartholomew et al. | |
| 5,364,395 A * | 11/1994 | West, Jr. | 606/46 |
| 5,677,651 A * | 10/1997 | Crane | 333/22 R |
| 5,710,403 A * | 1/1998 | Jusionis | 219/60 A |
| 5,929,748 A | 7/1999 | Odinak | |

(Continued)

OTHER PUBLICATIONS

"Centralized Commercial Building Applications with the Lonworks ® PLT-21 Power Line Transceiver", *Lonworks Engineering Bulletin, Echelon*, (Apr 1997)1-22.

(Continued)

*Primary Examiner*—Quynh H Nguyen
(74) *Attorney, Agent, or Firm*—Mel Barnes; Capital Legal Group, LLC

(57) ABSTRACT

A method of providing communications over a plurality of sets of twisted pair conductors connected to a plurality of communication devices located in a plurality of units of a multi-unit structure is provided. In one embodiment, the method comprises coupling a data signal comprising a first data packet to the plurality of sets of twisted pair conductors via a non-conductive coupler, wherein the first data packet includes a destination address. Next, the method comprises receiving the first data packet at the plurality of communication devices; providing the first data to a user device at one of the plurality of communication devices; and discarding the first data at multiple communication devices among the plurality of receiving communication devices. The plurality of sets of twisted pair conductors may form a bundle in which case the non-conductive coupler may comprise a magnetically permeable toroid configured to extend around substantially the entire circumference of the bundle and a winding wound around the toroid.

23 Claims, 3 Drawing Sheets

U.S. PATENT DOCUMENTS

| | | | |
|---|---|---|---|
| 6,151,480 | A | 11/2000 | Fischer et al. |
| 6,160,795 | A | 12/2000 | Hosemann |
| 6,181,783 | B1 * | 1/2001 | Goodman ................ 379/93.05 |
| 6,373,377 | B1 | 4/2002 | Sacca et al. |
| 6,417,762 | B1 | 7/2002 | Comer |
| 6,526,581 | B1 | 2/2003 | Edson |
| 6,587,739 | B1 | 7/2003 | Abrams et al. |
| 6,771,775 | B1 | 8/2004 | Widmer |
| 6,778,817 | B1 | 8/2004 | Bullock et al. |
| 6,842,459 | B1 | 1/2005 | Binder |
| 6,865,193 | B2 * | 3/2005 | Terk ........................... 370/493 |
| 6,952,159 | B1 | 10/2005 | Muller |
| 6,956,464 | B2 | 10/2005 | Wang et al. |
| 6,961,303 | B1 | 11/2005 | Binder |
| 6,975,212 | B2 | 12/2005 | Crenshaw et al. |
| 7,269,403 | B1 | 9/2007 | Miao |
| 2001/0028704 | A1 * | 10/2001 | Goodman ................ 379/93.01 |
| 2002/0011923 | A1 | 1/2002 | Cunningham et al. |
| 2002/0021716 | A1 * | 2/2002 | Terk ........................... 370/493 |
| 2002/0186699 | A1 | 12/2002 | Kwok |
| 2003/0050737 | A1 | 3/2003 | Osann, Jr. |
| 2003/0052770 | A1 | 3/2003 | Mansfield, Jr. et al. |
| 2003/0062990 | A1 | 4/2003 | Schaeffer, Jr. et al. |
| 2003/0071719 | A1 | 4/2003 | Crenshaw et al. |
| 2003/0100288 | A1 | 5/2003 | Tomlinson, Jr. et al. |
| 2003/0101459 | A1 | 5/2003 | Edson |
| 2003/0103307 | A1 | 6/2003 | Dostert |
| 2003/0106067 | A1 | 6/2003 | Hoskins et al. |
| 2004/0066283 | A1 | 4/2004 | Manis et al. |
| 2004/0178888 | A1 | 9/2004 | Hales et al. |
| 2004/0196144 | A1 | 10/2004 | Crenshaw et al. |
| 2004/0227623 | A1 | 11/2004 | Pozsgay |
| 2004/0233928 | A1 | 11/2004 | Pozsgay |
| 2005/0046550 | A1 | 3/2005 | Crenshaw et al. |
| 2005/0128057 | A1 | 6/2005 | Mansfield et al. |
| 2005/0164666 | A1 | 7/2005 | Lang et al. |
| 2005/0198219 | A1 * | 9/2005 | Banerjee et al. ............. 709/220 |
| 2005/0213874 | A1 * | 9/2005 | Kline ........................... 385/15 |
| 2005/0247479 | A1 * | 11/2005 | Kenny et al. ............ 174/113 R |
| 2005/0249245 | A1 | 11/2005 | Hazani et al. |
| 2006/0017324 | A1 | 1/2006 | Pace et al. |
| 2006/0034326 | A1 * | 2/2006 | Anderson et al. ........... 370/466 |
| 2006/0034330 | A1 | 2/2006 | Iwamura |
| 2006/0038660 | A1 | 2/2006 | Doumuki et al. |
| 2006/0049693 | A1 | 3/2006 | Abraham et al. |
| 2006/0050642 | A1 | 3/2006 | Chini et al. |
| 2006/0062166 | A1 * | 3/2006 | Jones et al. ................. 370/289 |
| 2006/0072695 | A1 | 4/2006 | Iwamura |
| 2006/0073805 | A1 | 4/2006 | Zumkeller et al. |
| 2006/0132299 | A1 | 6/2006 | Robbins et al. |
| 2006/0140260 | A1 | 6/2006 | Wasaki et al. |
| 2006/0165054 | A1 | 7/2006 | Iwamura |
| 2006/0187023 | A1 | 8/2006 | Iwamura |
| 2006/0193310 | A1 * | 8/2006 | Landry et al. ............... 370/356 |
| 2006/0251179 | A1 * | 11/2006 | Ghoshal ...................... 375/257 |
| 2007/0025244 | A1 | 2/2007 | Ayyagari et al. |
| 2007/0036171 | A1 | 2/2007 | Magin |
| 2007/0039035 | A1 | 2/2007 | Magin |
| 2007/0136766 | A1 | 6/2007 | Iwamura |
| 2007/0183447 | A1 | 8/2007 | Binder |
| 2007/0189182 | A1 | 8/2007 | Berkman et al. |
| 2007/0220570 | A1 | 9/2007 | Dawson et al. |
| 2007/0223381 | A1 * | 9/2007 | Radtke ....................... 370/236 |
| 2007/0236340 | A1 * | 10/2007 | White ................... 340/310.11 |
| 2009/0040030 | A1 | 2/2009 | Mathews et al. |

OTHER PUBLICATIONS

"Demand Side Management with LONWORKSO® Power Line Transceivers", *LONWORKS Engineering Bulletin*, (Dec 1996),1-36.

Horiguchi, Akira "High Speed Power Line Communication Technology", *Mitsubishi Electric Advance* vol. 109, (Mar. 2005),1-27.

Hawkins, Bob "Sault Ste. Marie, Canada's First Working BPL Installation", La Revuw des Radioamateurs Canadiens,(Jult & Aug. 2004),1-4.

* cited by examiner

SYSTEM AND METHOD FOR COMMUNICATING IN A MULTI-UNIT STRUCTURE

FIELD OF THE INVENTION

The present invention generally relates to methods and apparatus for communicating high data-rate data services and other data packet communication modalities, and more particularly to a system and method of data packet communication in a multi-unit structure.

BACKGROUND OF THE INVENTION

Users are increasingly relying on communications networks for entertainment, shopping, education, work and other areas of commerce. Users access entertainment appliances, such as televisions, to receive cable signals for viewing television shows and movies on demand. Users access the internet to exchange e-mail communications and access audio, video, multimedia and textual data. Delivering these various data services requires a communications infrastructure.

Delivering such services to multi-dwelling buildings and other multi-unit structures often requires individual communications media extending to each individual dwelling or unit. Utility services, such as telephone, power and cable TV often may provide wiring of a type that extends into each unit. For example, unshielded twisted pair wires may be used to deliver telephone services and digital subscriber line (DSL) internet communications. Coaxial cables may be used to provide television programming and broadband communications. Power lines may be used to deliver electrical power and broadband over power line (BPL) data services.

As the demand for high data-rate services of all kind increases, there is a need for efficient and effective ways of delivering these data services to users. The present invention addresses this need.

SUMMARY OF THE INVENTION

The present invention provides a device and method for providing communications over a plurality of conductors connected to a plurality of communication devices located in a plurality of units of a multi-unit structure is provided. In one embodiment, the method comprises coupling a data signal comprising a first data packet to a plurality of twisted pair conductors via a non-conductive coupler, wherein the first data packet includes a destination address. Next, the method comprises receiving the first data packet at the plurality of communication devices; providing the first data to a user device at one of the plurality of communication devices; and discarding the first data at multiple communication devices among the plurality of receiving communication devices. The plurality of sets of twisted pair conductors may form a bundle in which case the non-conductive coupler may comprise a magnetically permeable toroid configured to extend around substantially the entire circumference of the bundle and a winding wound around the toroid.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

Communication System Overview

Figure 1:
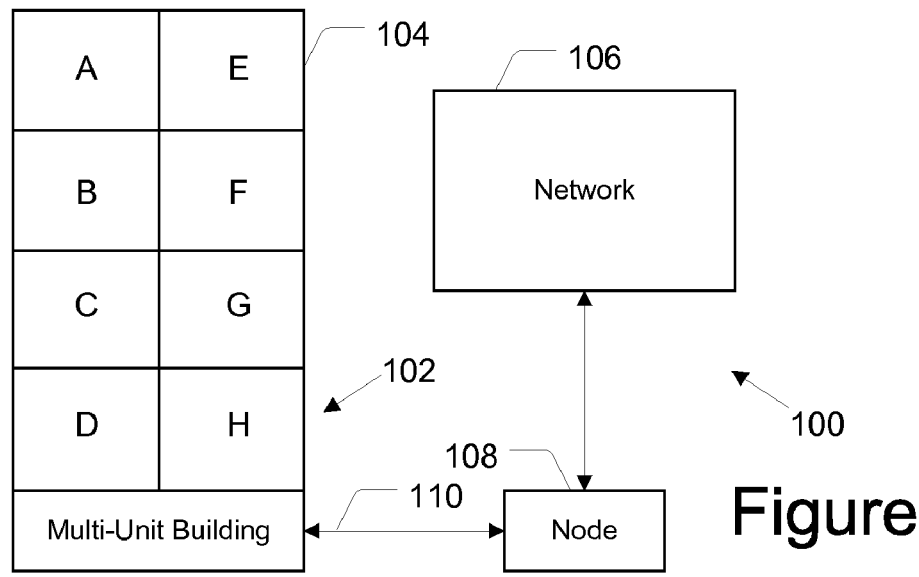
FIG. 1 is a block diagram of a communication network extending to a multi-unit structure.

FIG. 1 shows a communications network 100 that may provide high speed internet access, telephone communications, broadband communications, streaming video and audio services, and other communication services to each room, office, apartment or other unit 104 or sub-unit of a building or other multi-unit structure 102. The network 100 may provide these communication services to various structures, such as residences, apartments/condominium buildings, mixed use buildings, office buildings, industrial buildings, retail complexes, subway trains, airports, restaurants, elevators, etc.

The multi-unit structure 102 may be coupled to one or more networks 106 through one or more communications nodes 108 located at or away from the structure 102. A network 106 may be an internet protocol network (e.g., the Internet), a public switched telephone network, a power line communications network, a WiFi network, or another communications or data delivery communication network. The multi-unit structure 102 may be communicatively coupled to the node 108 over a communications medium 110. In various embodiments the communications medium 110 may comprise twisted pair conductors, coaxial cable, a T-1 line, a fiber optic cable, a wireless link, a medium voltage power line, a low voltage power line, another suitable communications medium, or any combination of the same.

Figure 2:
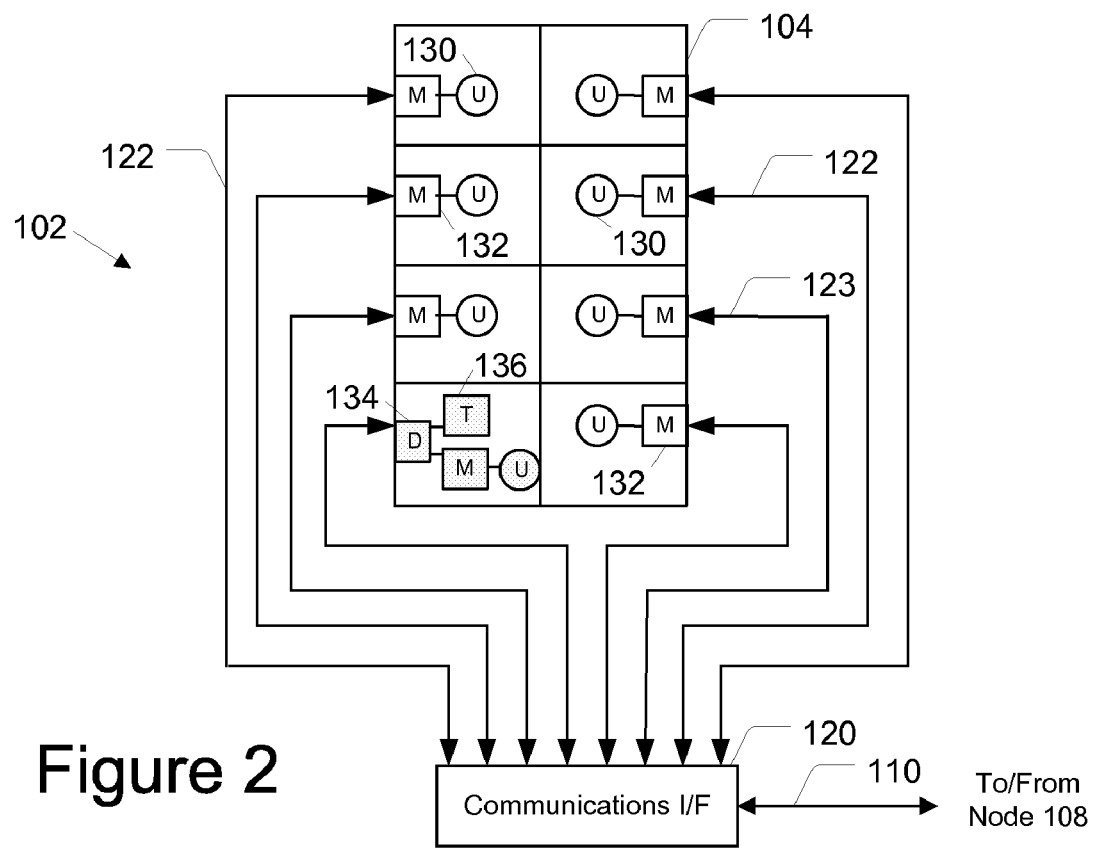
FIG. 2 is a diagram of an example embodiment of a network topology for a multi-unit structure according to an example embodiment of the present invention.

FIG. 2 shows the multi-unit structure 102 having a communications interface 120 which may maintain communication links with the communication node 108 over the communications medium 110. The multi-unit structure 102 may include multiple structural units 104 of which eight are shown in FIG. 2. Of these structural units 104 some or all of units 104 may be coupled to the communications interface 120. Those units 104 that are coupled to the communications interface 120 may be coupled via the respective sets of twisted pair conductors 122 (which typically are unshielded) that extend to the units 104. In other embodiments, units 104 may be coupled to the communications interface 120 (or to separate communications interface 120) using a different type of communications medium 123, (e.g., low voltage power lines, coaxial cables, shielded conductors).

As discussed, the communications media 122 of this embodiment includes unshielded conductors, such as the unshielded twisted pair conductors of the type used to deliver public switched telephone signals and DSL signals. Such twisted pair conductors may extend to a switching station (not shown) from which communications are directed. Accordingly, in large multi-unit structures there may be many sets of twisted pair conductors that are grouped together in one or more bundles. A problem with unshielded twisted pair wires and other unshielded cabling is that high frequency data signals communicated on one conductor may cross couple to another conductor even though the conductors in the bundle are not conductively connected. Such cross coupling may degrade communications performance. This can be of particular concern when delivering services using protocols lacking distinct destination addresses. For example, the DSL protocol does not use addressing (as there is no media access control layer), so any DSL modem connected to the downstream end of a twisted pair may receive and process (e.g., display) cross-coupled data. However, according to an embodiment of this invention, this problem instead is made into an advantage. As described below in a separate section, the communications interface 120 may insert an address and transmit the packet downstream to the units 104 over the entire bundle. A communication devices 132 at the receiving units 104 in turn receive the packets and determine, based on the address, whether to discard the data packet or provide the data packet (or data) to a local user device 130.

User devices 130 may communicate with the network 106 through the communication interface 120. Exemplary user devices 130 include a computer, LAN, a WLAN, router, Voice-over IP endpoint, game system, digital cable box, power meter, gas meter, water meter, security system, alarm system (e.g., fire, smoke, carbon dioxide, security/burglar, etc.), a mobile telephone, stereo system, television, fax machine, HomePlug power line communication residential network, or other device having a data interface. A user device 130 may include or be coupled to a communication device 132, such as a modem to communicate with the communications interface 120. Exemplary modems may include a substantially compatible Homeplug (1.0, A/V or Turbo) modem, an Ethernet transceiver, or other modem that includes a media access control (MAC) layer or other means for providing packet based address information to a data packet. Such modems may make the determination to process the packet (provide to a user device) or to discard the packet based on any address information (e.g., destination address and/or source address, and IP and/or MAC address) or other suitable information, which may be in the data packet. Further, in some embodiments a diplexer 134 may be included at the user end to allow one set of frequencies to pass to a telephone 136 or fax machine and another set of frequencies to pass to the user's modem 132.

Communication Protocols:

Communication within the multi-unit structure 102 also may occur using a variety of protocols and media. In one example, time division multiplexing is used while implementing one or more layers of the 7 layer open systems interconnection (OSI) model. For example, at the layer 3 'network' level, the communication devices (e.g., communication interface 120, nodes 108) may implement routing technologies (including switching, routing and/or bridging), and create logical paths, known as virtual circuits, for transmitting data from device to device, (e.g., interface 120 to modem 132). Similarly, error handling, congestion control and packet sequencing can be performed at Layer 3. In one example embodiment, Layer 2 'data link' activities include encoding and decoding data packets and handling errors of the 'physical' layer 1, along with flow control and frame synchronization. The configuration of the various communication devices may vary. In some embodiments, the communications may be time division multiple access or frequency division multiple access. Some embodiments may employ Carrier Sense Multiple Access with Collision Detection (CSMA/CD) (e.g., IEEE 802.3).

Figure 3:
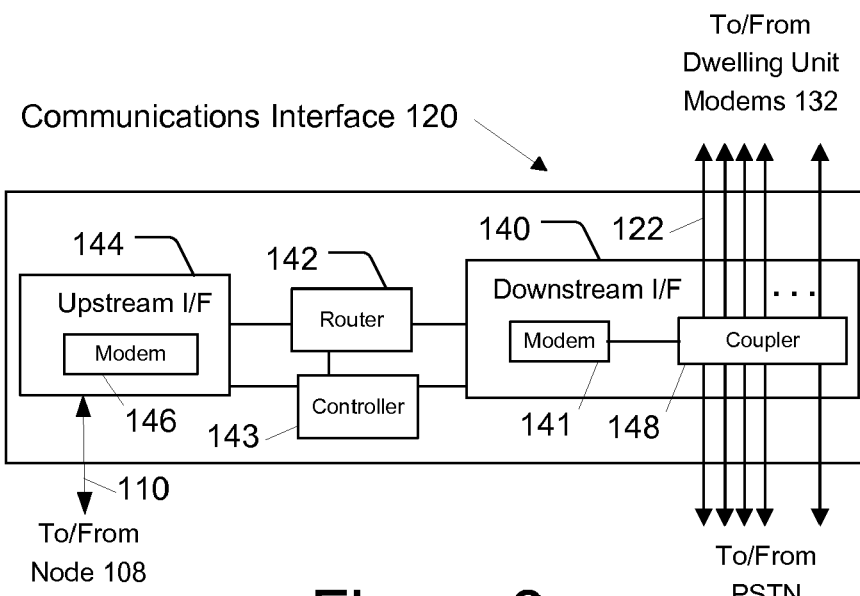
FIG. 3 is a block diagram of an example embodiment of a communication interface.

Communication Interface 120:

FIG. 3 shows a communications interface 120 according to one embodiment of the present invention. The interface 120 may include a downstream interface 140, a router 142, a controller 143 and an upstream interface 144. The router 140 and controller 143 are shown as separate functional components, but may be formed of the same physical elements (e.g., a processor and memory). In other words, the controller 143 may be programmed to provide routing functions. Downstream communications, which may originate outside the multi-unit structure 102, are received at the upstream interface 144, and may be routed by the router 142 to the downstream interface 140. Such downstream communications may be decoupled from the communications medium 110 and received at a modem 146 of the upstream interface 144, which demodulates the communication. The router 142 may process the communication and apply a destination address corresponding to one or more of the communication devices (e.g., modems 132) in the units 104. Thus, the router 142 (herein meant to include a bridge, switch, router, other such functional component) may include a routing table to determine which address (e.g., a destination MAC address of the modem) to insert in a data packet based on the destination IP address (e.g., corresponding to the computer or other user device) of the data packet. The router 142 may also determine that the data packet is addressed for the communications interface 120 itself and provide the data to the controller 143. If provided to the modem 141, the modem 141 may encode, encrypt, and modulate the communication, and may transmit the communication toward the structural units 104. A coupler 148 may couple the transmitted communication onto the communication media 122. The transmitted communication then may be received at the respective modems 132 of the respective units 104.

Upstream communications typically originate at a user device 130. A modem 132 may couple the user device 130 to one or more conductors of the communication media 122. The modem 132 may transmit the upstream communication to the communication interface 120 along the communications medium 122. Upstream communications may be decoupled from the communications medium 122 by the coupler 148, demodulated, decoded, and decrypted by the modem 141, and routed by the router 142 to the upstream interface 144. Specifically, the router 142 may process the communication and apply a destination address corresponding to an upstream device. Thus, the router 142 or controller 143 (acting as a router) may include a routing table to determine which address (e.g., a destination MAC address of the modem) to insert in a data packet based on a portion of the destination IP address (e.g., corresponding to the computer or other user device) or source address of the data packet. The modem 146 encodes, encrypts, and modulates the communication, and may transmit the communication toward the communication node 108. A coupler (not shown) of the upstream interface 144 may couple the transmitted communication onto the communication media 110. The transmitted upstream communication then may be received at the communication node 108 and transmitted onto the network 106 to an appropriate destination. In various embodiments, the upstream 144 and/or downstream interface 140 may also include signal conditioning circuit (e.g., amplifiers and bandpass filters) between the modem 141/146 and the coupler 148 or communications media 110. The routing table described herein, in addition to commands and other control messages, may be received via the upstream interface and stored in memory.

In some embodiments the communications interface 120 may provide communication services for user devices 130 such as security management; IP network protocol (IP) packet routing; data filtering; access control; service level monitoring; service level management; signal processing; and modulation/demodulation of signals transmitted over the communication medium. Such services may be managed by the controller 143.

Figure 4:
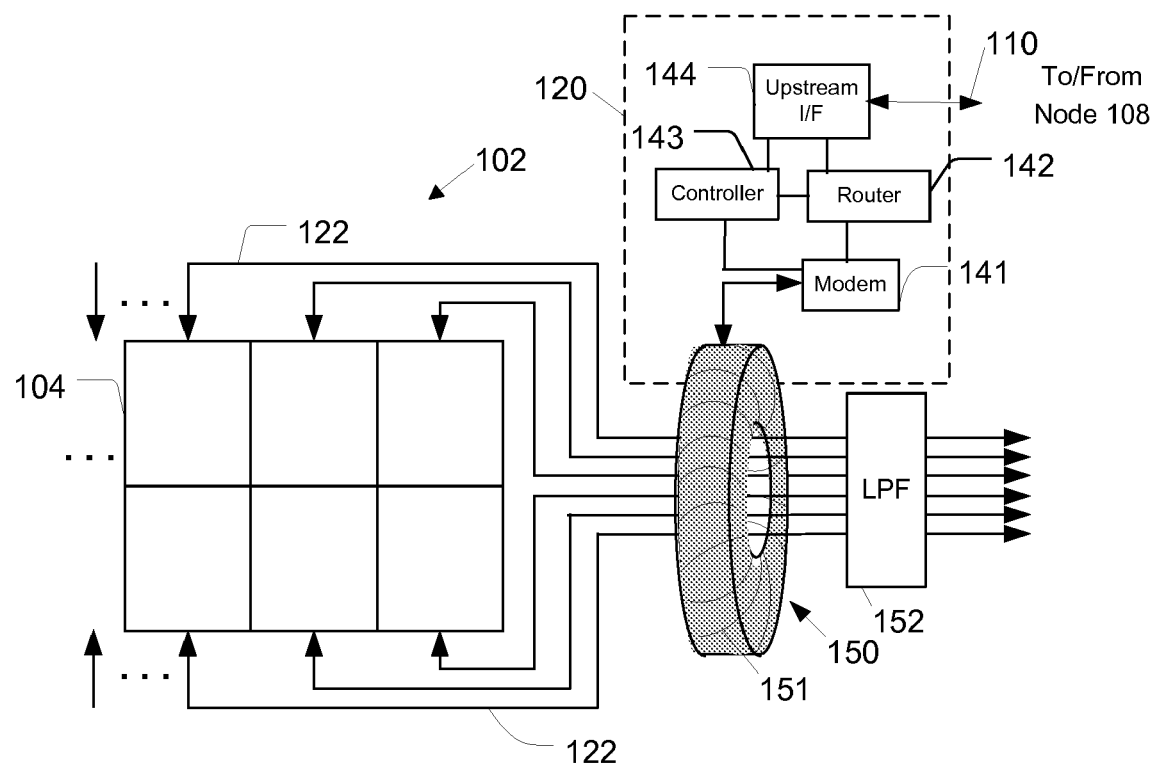
FIG. 4 is a diagram of a multi-unit structure serviced by an example embodiment of a communication interface.

FIG. 4 shows an example embodiment of a communication interface 120 in which the coupler 148 is embodied as an inductive coupler 150. In such embodiment, components performing the same or similar functions as the corresponding components of the interface 120 of FIG. 3 are given the same part numbers as their corresponding components. The inductive coupler 150 of interface 120 takes advantage of the cross coupling effect of the twisted pair conductors 122. In one embodiment the inductive coupler may be formed by a magnetically permeable toroid that surrounds the bundle of twisted pair conductors 122 that extend to the structural units 104. The toroid may be hinged to allow for easy installation and removal. A winding 151 around the toroid is connected to the modem 141 (e.g., via amplifiers and bandpass filters). Communications from the modem 141 of the downstream interface 140 traverse the winding 151 wound around the toroid 150. The toroid inductively couples a downstream data signals from the modem 141 onto the multiple sets of twisted pair conductors 122. As a result, the downstream communication is transmitted along each one of multiple sets of twisted pair conductors. In some embodiments, the bundle may comprise more than one type of conductor. For example, the bundle may include one or more twisted pair conductors and one or more low voltage power lines and/or other conductor type.

Communications from the modems 132 in the units 140 will traverse through the twisted pair conductors 122 to the coupler 150, where the data signals are inductively coupled to the winding 151 of the coupler 140 and received by the modem 141. As a result, the downstream communication is transmitted along each one of multiple sets of twisted pair conductors. The data signals communicated by the interface 120 may be in a different frequency band than voice band information (e.g., fax, voice communications) carried by the twisted pair conductors (which may be carried simultaneously). The data signals communicated by the interface 120 also may be in a different frequency band than digital subscriber line (DSL) data carried by the twisted pair conductors (which may be carried simultaneously). In some embodiments a low pass filter 152 (to attenuate the data signals) also may be included to avoid or minimize egression of the data signals form the multi-unit structure along a twisted pair conductor network, such as the public switched telephone network, while allowing the voice band and/or DSL signals to pass.

Figure 5:
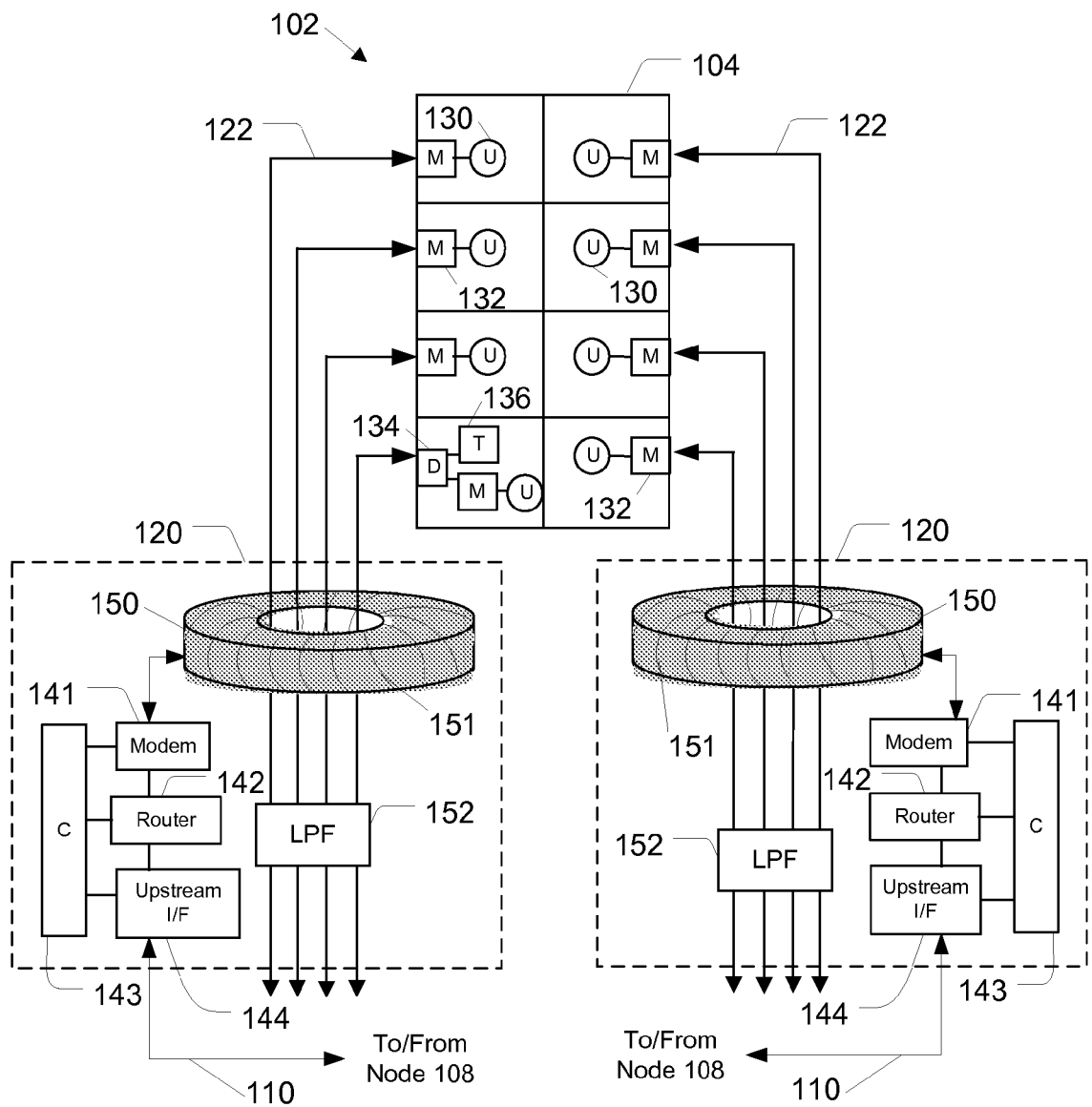
FIG. 5 is a diagram of a multi-unit structure serviced by multiple communication interfaces.

FIG. 5 shows an example multi-unit structure 102 topology in which multiple communication interfaces 120 are implemented to deliver communications to the structural units 104. Multiple communication interfaces 120 may be desirable, for example, in structures having excessive communication traffic, when the bundles are sufficiently large to preclude reliable coupling to each conductor, and/or for other reasons. In such cases, coupling all the downstream communications onto every set of twisted pair conductors 122 may exceed a maximum bandwidth (e.g., the maximum data rate of the interface 120). By separating the sets of twisted pair conductors 122 into two or more bundles, and connecting each bundle to a separate interface 120, greater communication traffic can be provided within the structure 102. Alternately, each bundle may be allocated a separate coupler 148/150, both of which form part of the same downstream interface 140 of the same interface 120, to allow for better coupling. Thus, one method of providing communications may include providing a first communications interface to provide communications to the structure via a bundle, determining that the data traffic through the communications interface has reached a predetermined capacity, separating the bundle into two or more bundles, and providing communications over the two or more bundles via two or more communications interfaces.

In an alternative embodiment the bundled communication media 122 coupled to the communication interface 120 may be multiple LV power lines (which may or may not be conductively connected). In such embodiment the coupler 150 couples the signals to and from the LV power lines which extend to respective units 104. Within a given structural unit the modems 132 may be embodied by power line modems, such as of the type that plug into a power outlet. In such an embodiment a user device 130 may connect to the power line modem to communicate via the network 100.

In another alternative embodiment the bundled communication media 122 coupled to the communication interface 120 may be multiple shielded coaxial cables. The coaxial cables extend to the respective structural units 104. In such embodiment the coupler 150 may couple the signals to and from the outer shielding of the coaxial cables. Within a given structural unit, the modem 132 may be embodied by a cable modem or any suitable modem with a MAC layer. In such an embodiment a user device 130 may connect to the cable modem or other modem to access the network 100. Also, in some instances, only one coaxial cable may extend to multiple units with the cable being split (via a T connector) for each floor and/or unit. In some instances the coupler may be used to couple data signals to and from the coaxial cable (e.g., the shield).

The downstream communications may be received at the modems 132 within each of multiple structural units 104. The modems 132 then process the received data packets (demodulate, decode, and decrypt), and determine whether the destination address (e.g., MAC address or IP address) of the packet matches or corresponds to the address of any local destination device—for example, depending on the architecture of the system, the MAC address of local modem 132 or the IP address of a user device 130. If the destination address within the received data packet communication does not correspond to a local destination address, then the communication is discarded. When the destination address within the received data packet communication does correspond to a local destination address, the communication is processed (e.g., provided to the destination device).

In one embodiment, the router 142 may inspect the IP source address or IP destination address and set priority tags of the upstream data packets (data packets transmitted from modems 132) accordingly. For example, if the source address of the upstream data packet corresponds to a Voice-over-IP (VoIP) endpoint, the router may set the IEEE 802.1p priority to 6 and sets a DiffServ priority to EF. In a second embodiment, the DiffServ tag may already be set (e.g., by the end user device) and the router may inspect both the source and destination addresses. Accordingly, in some instances the communication interface 120 may receive multiple communications from multiple communication devices 132, and prioritize processing and further transmission of one communication over another according to predefined criteria. In addition, in some embodiment it may be desirable to perform channel encoding/decoding, source encoding/decoding, error checking, and/or error correction at each device (e.g., 120 and 132).

In an alternate embodiment, a capacitive coupler or a hybrid capacitive-inductive coupler may be employed to allow coupling. Like the inductive coupler described above, some embodiments of such couplers may allow communication of the data signals to and from the conductors without making electrical (conductive) contact and are examples of non-conductive couplers. In yet another embodiment, the downstream interface 140 may be conductively connected to one (or both) conductors of each set of the twisted pair conductors. In yet another embodiment, the downstream interface 140 may be conductively connected to one (or both) conductors of some subset of the entire bundle (in which case the signals may cross couple to and from the conductors to which the device 120 is not conductively coupled). Finally, while addressing is used to transmit data to a select device in the above embodiment, other embodiments may use other means. For example, in an alternate embodiment the device 120 may transmit the data packets with different encryption keys so that only the one or more communication devices that are the correct destination devices can decrypt and process the data packet. In one embodiment, a different encryption key may be used to communicate with each device 120.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of providing communications over a plurality of sets of twisted pair conductors connected to a plurality of communication devices located in a plurality of units of a multi-unit structure and wherein the plurality of sets of twisted pair conductors form a bundle, the method comprising:
   providing a non-conductive coupler having a magnetically permeable toroid configured to extend around substantially the entire circumference of the bundle and at least one conductor that comprises a winding wound around said toroid;
   positioning the non-conductive coupler so that the toroid surrounds the plurality of sets of twisted pair conductors;
   coupling a data signal comprising a first data packet to the plurality of sets of twisted pair conductors via the non-conductive coupler, wherein the first data packet includes a destination address;
   receiving the first data packet at the plurality of communication devices;
   providing the first data to a user device at one of said plurality of communication devices; and
   discarding the first data at multiple communication devices among the plurality of receiving communication devices.

2. The method of claim 1, further comprising prior to said coupling:
   receiving first data;
   determining a destination address for the first data; and
   providing the destination address in the first data packet.

3. The method of claim 1, further comprising:
   receiving a second data packet comprising second data from a first communication device of the plurality of communication devices;
   receiving a third data packet comprising third data from a second communication device of the plurality of communication devices; and
   prioritizing upstream transmission of the second data over the third data.

4. The method of claim 3, wherein said prioritizing is based, at least in part, on information in the second data packet.

5. The method of claim 3, further comprising:
   determining a destination address for the second data; and
   providing the destination address in a data packet with the second data.

6. he method of claim 1, wherein at least some of the plurality of sets of twisted pair conductors are configured to conduct voice band information to a public switch telephone network and the data signal is in a frequency band that is different from the voice band information.

7. The method of claim 1, wherein at least some of the plurality of sets of twisted pair conductors are configured to conduct digital subscriber line data and the data signal is in a frequency band that is different from the digital subscriber line data.

8. The method of claim 1, wherein said coupling comprises inductively coupling.

9. The method of claim 1, further comprising attenuating the data signal to inhibit egression of the data signal from the multi-unit structure.

10. A method of providing communications over a plurality of twisted pair conductors connected to a plurality of communication devices located in a plurality of units of a multi-unit structure and wherein the plurality of sets of twisted pair conductors form a bundle, the method comprising:
    receiving first data;
    determining a destination address for the data;

providing the first data in a first data packet with the destination address;

providing a non-conductive coupler having a magnetically permeable toroid and a conductor forming a winding around the toroid;

positioning toroid of the non-conductive coupler at least partially around the plurality of sets of twisted pair conductors; and inductively coupling a data signal comprising the first data packet to the plurality of twisted pair conductors via the non-conductive coupler.

11. The method of claim 10, further comprising:

receiving the first data packet at the plurality of communication devices;

providing the first data to a user device at one of said plurality of communication devices; and discarding the first data at multiple communication devices among the plurality of receiving communication devices.

12. The method of claim 10, further comprising:

receiving a second data packet comprising second data from a first communication device of the plurality of communication devices;

receiving a third data packet comprising third data from a second communication device of the plurality of communication devices; and prioritizing upstream transmission of the second data over the third data.

13. The method of claim 10, wherein at least some of the plurality of sets of twisted pair conductors are configured to conduct voice band information to a public switch telephone network and the data signal is in a frequency band that is different from the voice band information.

14. A device for providing communications over a plurality of twisted pair conductors forming a bundle and that each extend to a different one of a plurality of units in a multi-unit structure and wherein the conductors are connected to a plurality of communication devices located in different units of the multi-unit structure, comprising:

a non-conductive coupler configured to couple data signals to and from the plurality of twisted pair conductors;

a modem including a media access control layer;

wherein said non-conductive coupler comprises a toroid configured to extend around substantially the entire circumference of the bundle and a winding wound around said toroid and communicatively coupled to said modem;

a router in communication with said modem and having a routing table that includes an address for each of the plurality of communication devices;

an upstream interface configured to receive downstream data and to provide the downstream to data to said router; and wherein said router is configured to receive downstream data from the upstream interface and to select one of said addresses from the routing table for the data and to provide the address and data to the modem for transmission over the plurality of conductors.

15. The device of claim 14, wherein said router is configured to prioritize upstream data.

16. The device of claim 15, wherein said router is configured to prioritize upstream data based, at least in part, on information in the upstream data packets.

17. The device of claim 14, wherein at least some of the plurality of twisted pair conductors are configured to conduct voice band information to a public switch telephone network and said modem is configured to transmit data in a frequency band that is different from the voice band information.

18. The device of claim 14, wherein at least some of the plurality of sets of twisted pair conductors are configured to conduct digital subscriber line data and said modem is configured to transmit data in a frequency band that is different from the digital subscriber line data.

19. The device of claim 14, wherein said non-conductive coupler comprises an inductive coupler.

20. The device of claim 14, further comprising a low pass filter coupled to the plurality of twisted pair conductors and configured to attenuate data signals transmitted by said modem to inhibit egression of the data signals from the multi-unit structure.

21. The device of claim 14, wherein said upstream interface includes a fiber optic transceiver.

22. The device of claim 14, wherein a low voltage power line extends to a plurality of units in a multi-unit structure, and wherein the non-conductive coupler is configured to couple data signals to the plurality of twisted pair conductors and the low voltage power line simultaneously.

23. The device of claim 14, wherein a plurality of low voltage power lines extend to a plurality of units in a multi-unit structure, and wherein the non-conductive coupler is configured to couple data signals to and from the low voltage power lines.

* * * * *

UNITED STATES PATENT AND TRADEMARK OFFICE
CERTIFICATE OF CORRECTION

PATENT NO. : 7,602,695 B2
APPLICATION NO. : 11/421278
DATED : October 13, 2009
INVENTOR(S) : William H. Berkman It is certified that error appears in the above-identified patent and that said Letters Patent is hereby corrected as shown below:

Page 2, in field (56), under "Other Publications", in column 2, line 1, delete "LONWORKSO®" and insert -- LONWORKS® --, therefor.

Page 2, in field (56), under "Other Publications", in column 2, line 6, delete "(Jult" and insert -- (July --, therefor.

In column 8, line 45, in Claim 6, delete "he" and insert -- The --, therefor.

In column 9, line 6, in Claim 10, before "toroid" insert -- the --.

Signed and Sealed this

Twenty-second Day of December, 2009

David J. Kappos
*Director of the United States Patent and Trademark Office*